(12) United States Patent
Biskeborn et al.

(10) Patent No.: US 8,488,275 B2
(45) Date of Patent: Jul. 16, 2013

(54) HIGH AREAL DENSITY TAPE FORMAT AND HEAD

(75) Inventors: Robert Glenn Biskeborn, Hollister, CA (US); Wayne Isami Imaino, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/460,430

(22) Filed: Apr. 30, 2012

(65) Prior Publication Data

US 2012/0212856 A1    Aug. 23, 2012

Related U.S. Application Data

(60) Continuation of application No. 12/987,750, filed on Jan. 10, 2011, now Pat. No. 8,199,434, which is a continuation of application No. 12/751,870, filed on Mar. 31, 2010, now Pat. No. 7,952,832, which is a division of application No. 11/464,461, filed on Aug. 14, 2006, now Pat. No. 7,791,834.

(51) Int. Cl.
*G11B 5/78* (2006.01)
*G11B 5/29* (2006.01)

(52) U.S. Cl.
USPC .......................................... 360/134; 360/121

(58) Field of Classification Search
USPC ............................. 360/77.12, 121, 134, 132
See application file for complete search history.

(56) References Cited

U.S. PATENT DOCUMENTS

| | | | |
|---|---|---|---|
| 4,439,793 | A | 3/1984 | Nater |
| 6,236,538 | B1 | 5/2001 | Yamada et al. |
| 6,322,015 | B1 | 11/2001 | Trabert |
| 6,462,904 | B1 | 10/2002 | Albrecht et al. |
| 6,522,490 | B1 | 2/2003 | Cates et al. |
| 6,760,198 | B2 | 7/2004 | Jarratt |
| 6,760,199 | B2 | 7/2004 | Biskeborn |
| 6,839,200 | B2 | 1/2005 | Takano et al. |

(Continued)

FOREIGN PATENT DOCUMENTS

| | | |
|---|---|---|
| JP | 58070417 A | 4/1983 |
| JP | 2006/018953 | 1/2006 |

(Continued)

OTHER PUBLICATIONS

Restriction/Election Requirement from U.S. Appl. No. 11/464,461 dated Jan. 8, 2009.

(Continued)

*Primary Examiner* — Jefferson Evans
(74) *Attorney, Agent, or Firm* — Zilka-Kotab, PC

(57) ABSTRACT

A magnetic recording tape according to one embodiment includes a plurality of servo tracks, each servo track comprising a series of magnetically defined bars, wherein an angle between at least some of the bars is greater than about 10 degrees, wherein an average height of the bars is less than 190 microns, wherein one of the servo tracks has data encoded therein, the data being selected from a group consisting of data for encryption and data for ascertaining a longitudinal position along the tape. A magnetic recording tape according to another embodiment includes at least about eight data bands, wherein each data band is defined between a pair of adjacent servo tracks, each pair of adjacent servo tracks defining only a single data band therebetween, wherein about eight to about twenty six data bands are present on the tape.

18 Claims, 9 Drawing Sheets

U.S. PATENT DOCUMENTS

| | | | |
|---|---|---|---|
| 6,937,413 B2 * | 8/2005 | Bui et al. | 360/77.12 |
| 7,190,551 B2 | 3/2007 | Suda | |
| 7,259,939 B2 | 8/2007 | Sato | |
| 7,283,320 B2 | 10/2007 | Tsujimoto et al. | |
| 7,386,933 B1 | 6/2008 | Krounbi et al. | |
| 7,538,969 B2 * | 5/2009 | Weber et al. | 360/77.12 |
| 7,623,310 B2 | 11/2009 | Nakao | |
| 7,791,834 B2 | 9/2010 | Biskeborn et al. | |
| 7,952,832 B2 | 5/2011 | Biskeborn et al. | |
| 8,199,434 B2 | 6/2012 | Biskeborn et al. | |
| 2002/0093772 A1 | 7/2002 | Yoshida et al. | |
| 2003/0002227 A1 | 1/2003 | Jarratt | |
| 2005/0041320 A1 | 2/2005 | Bui et al. | |
| 2005/0168869 A1 | 8/2005 | Dugas et al. | |
| 2005/0219734 A1 | 10/2005 | Rothermel et al. | |
| 2005/0254161 A1 | 11/2005 | Nakao | |
| 2005/0254163 A1 | 11/2005 | Nakao | |
| 2005/0254170 A1 | 11/2005 | Dugas et al. | |
| 2006/0039082 A1 | 2/2006 | Biskeborn et al. | |
| 2006/0209450 A1 | 9/2006 | Saliba | |
| 2009/0073604 A1 | 3/2009 | Johnson et al. | |
| 2009/0147399 A1 | 6/2009 | Dugas et al. | |
| 2010/0182720 A1 | 7/2010 | Biskeborn et al. | |
| 2011/0102943 A1 | 5/2011 | Biskeborn et al. | |

FOREIGN PATENT DOCUMENTS

| | | |
|---|---|---|
| JP | 2006/048852 | 2/2006 |
| JP | 2006/172705 | 6/2006 |
| WO | 2005/109405 A1 | 11/2005 |

OTHER PUBLICATIONS

Non-Final Office Action Summary from U.S. Appl. No. 11/464,461 dated Mar. 2, 2009.

Non-Final Office Action Summary from U.S. Appl. No. 11/464,461 dated Sep. 15, 2009.

Final Office Action Summary from U.S. Appl. No. 11/464,461 dated Feb. 24, 2010.

Notice of Allowance and Fee(s) Due from U.S. Appl. No. 11/464,461 dated Apr. 15, 2010.

Supplemental Notice of Allowability from U.S. Appl. No. 11/464,461 dated Jul. 13, 2010.

Non-Final Office Action Summary from U.S. Appl. No. 12/751,870 dated May 17, 2010.

Final Office Action Summary from U.S. Appl. No. 12/751,870 dated Nov. 12, 2010.

Non-Final Office Action Summary from U.S. Appl. No. 12/987,750 dated Apr. 13, 2011.

Final Office Action Summary from U.S. Appl. No. 12/987,750 dated Oct. 17, 2011.

Notice of Allowance and Fee(s) Due from U.S. Appl. No. 12/987,750 dated Feb. 8, 2012.

Office Communication from U.S. Appl. No. 12/987,750 dated Mar. 22, 2012.

* cited by examiner

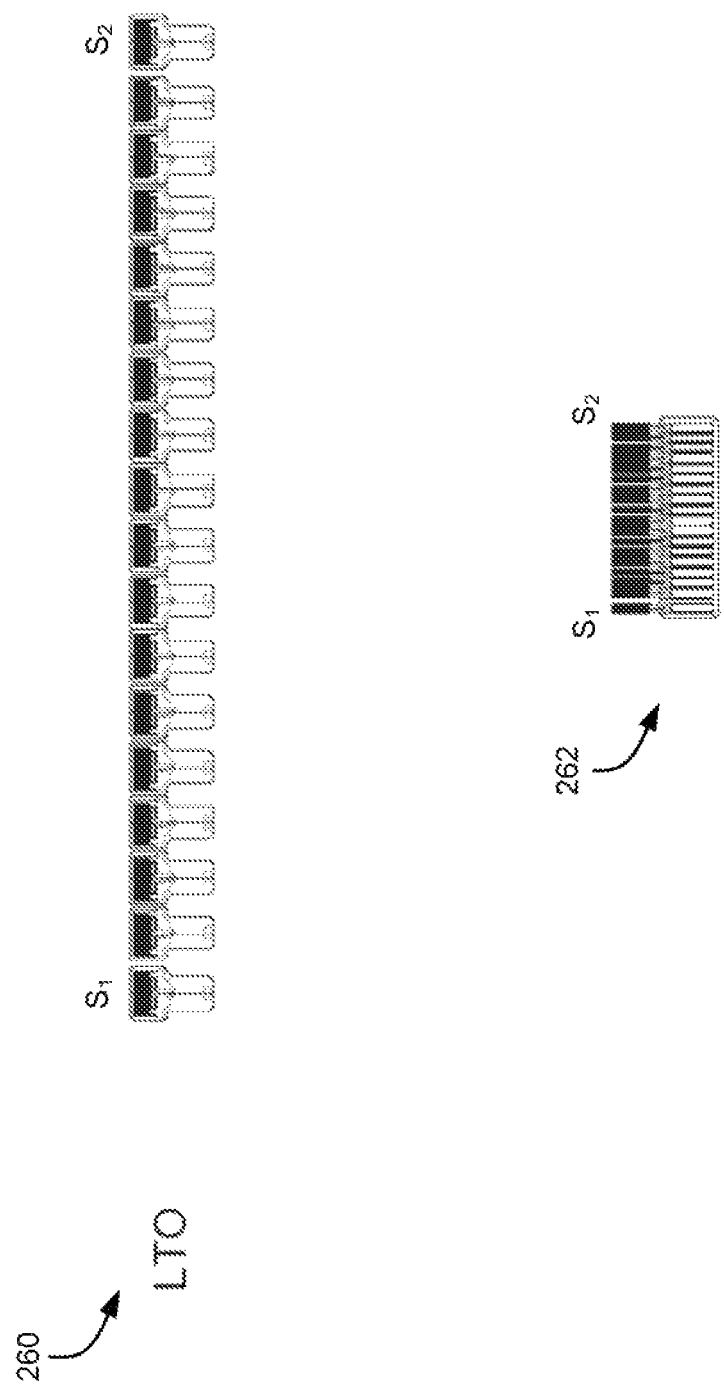

HIGH AREAL DENSITY TAPE FORMAT AND HEAD

RELATED APPLICATIONS

This application is a continuation of U.S. patent application Ser. No. 12/987,750, filed Jan. 10, 2011, which is continuation of U.S. Pat. No. 7,952,832, granted May 31, 2011, which is a divisional of U.S. Pat. No. 7,791,834, granted Sep. 7, 2010, from all of which priority is claimed and which are herein incorporated by reference.

BACKGROUND

The present invention relates to tape-based data storage systems, and more particularly, this invention relates to a tape-based data storage system, and components thereof, having a reduced writer pitch.

Business, science and entertainment applications depend upon computing systems to process and record data. In these applications, large volumes of data are often stored or transferred to nonvolatile storage media, such as magnetic discs, magnetic tape cartridges, optical disk cartridges, floppy diskettes, or floptical diskettes. Typically, magnetic tape is the most economical, convenient, and secure means of storing or archiving data.

Storage technology is continually pushed to increase storage capacity and storage reliability. Improvement in data storage capacities in magnetic storage media, for example, has resulted from improved medium materials, improved error correction techniques and decreased areal bit sizes. The data capacity of half-inch magnetic tape, for example, is currently measured in hundreds of gigabytes.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM® Corporation. Later sensors using the GMR effect were developed. AMR and GMR sensors transduce magnetic field changes to resistance changes, which are processed to provide digital signals. AMR and GMR sensors offer signal levels higher than those available from conventional inductive read heads for a given read sensor width and so enable smaller reader widths and thus more tracks per inch, and thus higher data storage density. Moreover, the sensor output signal depends only on the instantaneous magnetic field intensity in the storage medium and is independent of the magnetic field time-rate-of-change arising from relative sensor/medium velocity. In operation the magnetic storage medium, such as tape or a magnetic disk surface, is passed over the magnetic read/write (R/W) head assembly for reading data therefrom and writing data thereto.

When a tape is written to, the span of data just written is the span of the head elements. However, any expansion and contraction of the tape prior to reading results in an expansion or contraction of the space between data tracks and thus the data span. Present tapes typically expand and contract by approximately 1 part in 1000, or 0.1%.

In current Linear Tape Open (LTO) systems, the heads include servo readers that are approximately 3 mm apart. The tape media also includes servo tracks having a spacing of about 3 mm, thereby defining data bands of about 3 mm. A 0.1% expansion over 3 mm results in about 3 micrometers of expansion for a data band. Accordingly, the data tracks themselves must be greater than the reader widths plus 3 micrometers or the readback will suffer from expansion- or contraction-induced misregistration. Accordingly, current tape formats are reaching their limits as far as increasing track density is concerned. To illustrate, consider the following example.

In current tape head products, read sensor width is chosen to be ½ the track width on the tape. Assume that the tracks are 12 micrometers wide. The sensor is then 6 microns wide. If at the outer tracks, there are 3 micrometers of misregistration, then the readers over the outer data bands may be riding along the edge of the data band. Then the reader may come off the track due to uncompensated lateral tape excursions. Accordingly, the track widths (in this example) cannot be made smaller without increased risk of misreads due to tape wobble.

One method for compensating for tape lateral expansion and contraction is statically rotating the head and then making small angular adjustments to keep the readers/writers in the head aligned to tracks on the tape. However, the static rotation leads to skew-related misregistration and is generally complex and difficult to implement. For example tilted heads must be constructed so as not to steer tape, etc.

Another proposed solution attempts to control the tape width by controlling tape tension. However, this method works over a limited range only, and generally does not provide enough control.

BRIEF SUMMARY

A magnetic recording tape according to one embodiment includes a plurality of servo tracks, each servo track comprising a series of magnetically defined bars, wherein an angle between at least some of the bars is greater than about 10 degrees, wherein an average height of the bars is less than 190 microns, wherein one of the servo tracks has data encoded therein, the data being selected from a group consisting of data for encryption and data for ascertaining a longitudinal position along the tape.

A magnetic recording tape according to another embodiment includes at least about eight data bands, wherein each data band is defined between a pair of adjacent servo tracks, each pair of adjacent servo tracks defining only a single data band therebetween, wherein about eight to about twenty six data bands are present on the tape.

A magnetic recording tape according to yet another embodiment includes a plurality of servo tracks, each servo track comprising a series of magnetically defined bars, wherein an average height of the bars is less than about 50 microns, wherein about eight to about twenty six data bands are present on the tape.

A tape supply cartridge according to various embodiments has a magnetic recording tape as described herein.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the present invention, as well as the preferred mode of use, reference should be made to the following detailed description read in conjunction with the accompanying drawings.

FIG. 2E is a comparative view of a prior art element array relative to two element arrays according to embodiments of the present invention.

DETAILED DESCRIPTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

The embodiments described below disclose a new tape format and head design.

Figure 1:
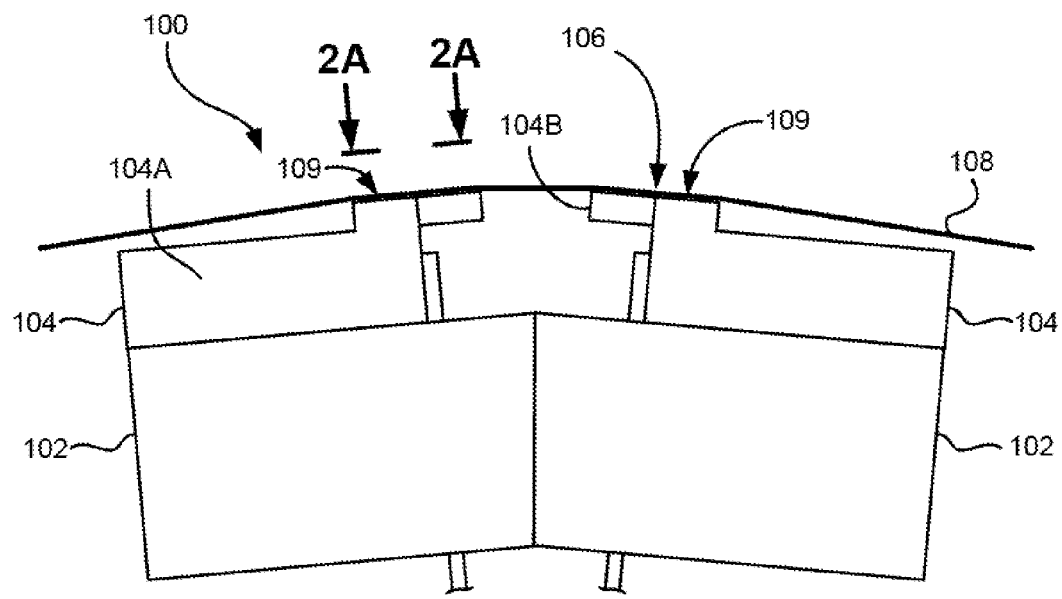
FIG. 1 illustrates a flat-lapped magnetic tape head, in accordance with one embodiment of the present invention.

FIG. 1 illustrates a flat-lapped bi-directional, two-module magnetic tape head 100, in accordance with one embodiment of the present invention. As shown, the head includes a pair of bases 102, each equipped with a module 104. The bases may be "U-beams" that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

Figure 2B:
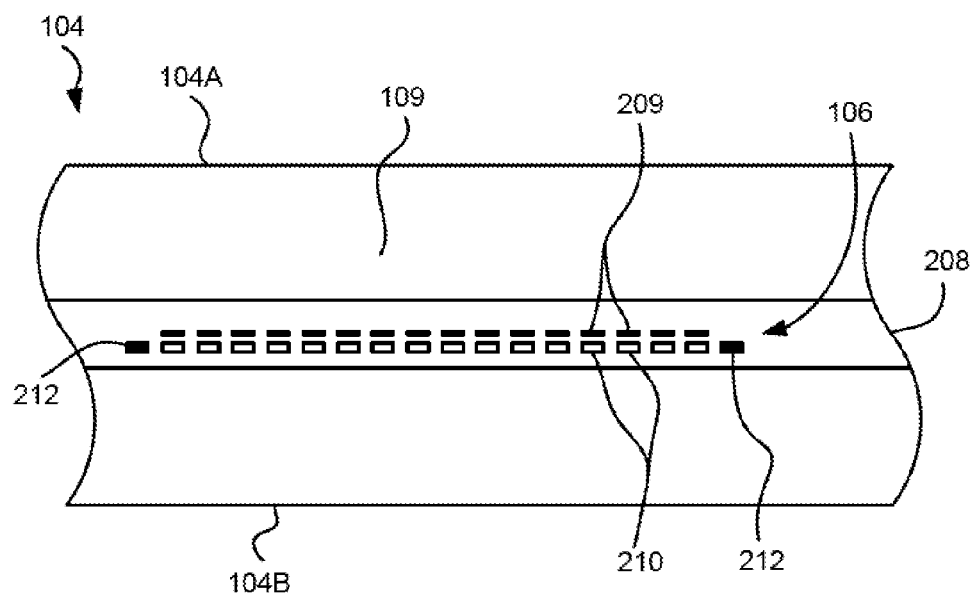
FIG. 2B is a detailed view taken from Circle 2B of FIG. 2A.
Figure 2A:
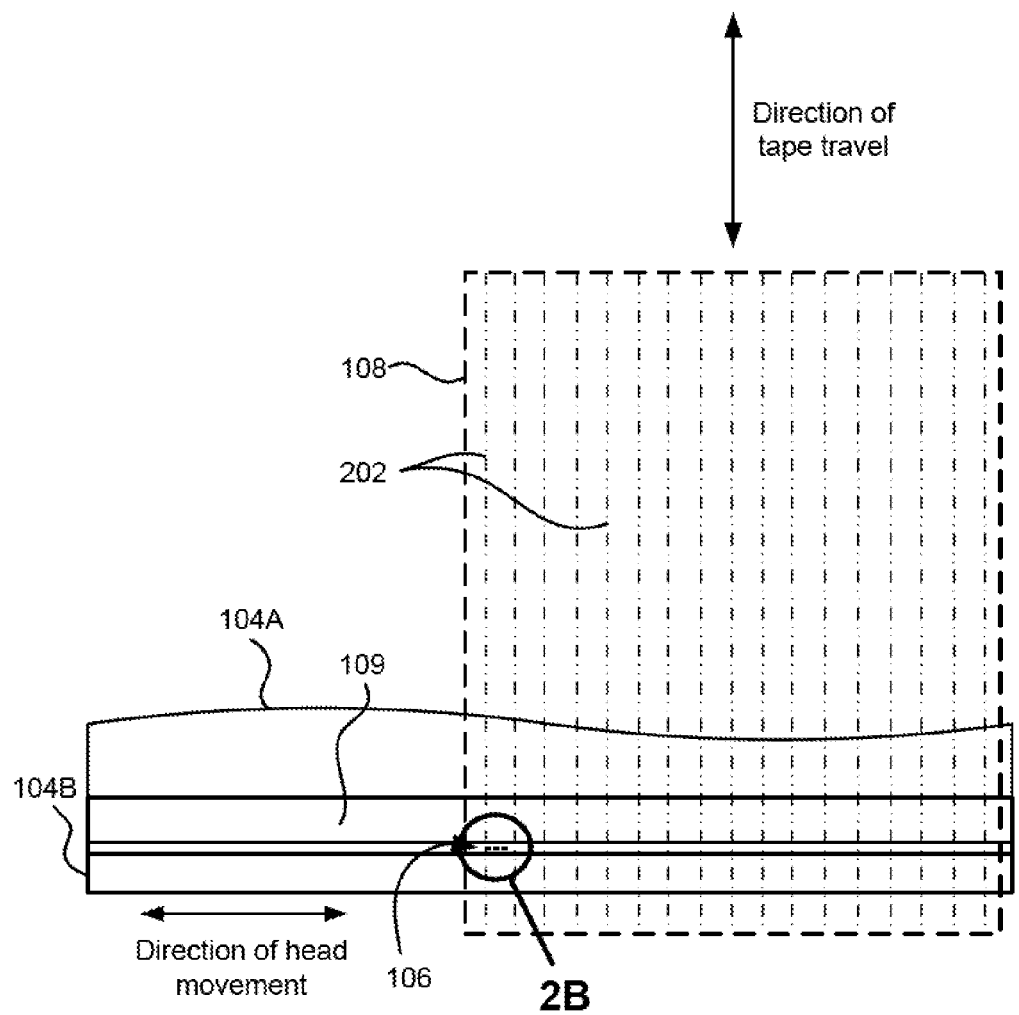
FIG. 2A is a tape bearing surface view taken from Line 2A of FIG. 1.

FIG. 2A illustrates the tape bearing surface 109 of one of the modules 104. A representative tape 108 is shown in dashed lines. The module is long enough to be able to support the tape as the head steps between data bands.

A preferred embodiment of the tape 108 includes 12-22 data bands, e.g., with 16 data bands and 17 servo tracks 202, as shown in FIG. 2A on a one-half inch wide tape. The data bands are defined between servo tracks 202. Each data band may include a number of data tracks, for example 96 data tracks (not shown). During read/write operations, the elements 106 are positioned within one of the data bands. Outer readers, sometimes called servo readers, read the servo tracks 202. The servo signals are in turn used to keep the elements 106 aligned with a particular track during the read/write operations. Typically, a coarse positioner (worm gear, etc.) places the head generally adjacent a given data track, then a fine positioner (voice coil, etc.) keeps the heads aligned using the servo tracks.

Though the number of servo tracks 202 is large, the width of a given data band is small, and so the width of each servo track is correspondingly small. Though intuitively more servo tracks would be expected to use more tape area, this reduction in data band width and servo track width actually gives more area on tape for data tracks. Thus, the embodiment shown in FIG. 2A provides a net data capacity gain of a few percent over a present LTO tape having four data bands and five servo tracks.

Figure 2C:
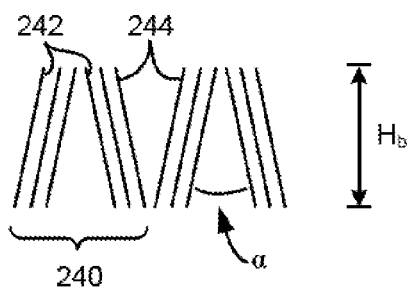
FIG. 2C is a representative view of a prior art servo pattern.
Figure 2D:
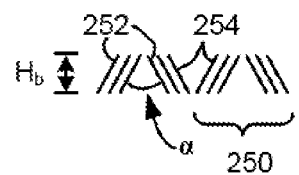
FIG. 2D is a representative view of a prior art servo pattern according to one embodiment of the present invention.

A typical servo track, shown in FIG. 2C, includes repeating servo patterns 240. A typical servo pattern 240 includes a magnetically-defined base set 242 (e.g., in a chevron shape: / \) of two or more magnetically-defined bars 244, which are typically written concurrently. Servo patterns 240 may include groups of the base sets 242 nested with one another (e.g., /// \\\). In one embodiment of the present invention, the height ($H_b$) of the bars 244 in the servo pattern are reduced by about a factor of four or more from servo pattern data currently in commercial use in, e.g., LTO-compliant products. In one illustrative embodiment, shown in FIG. 2D, the average height ($H_b$) of the bars 254 in the servo pattern 250 are reduced from about 190 microns to less than about 50 microns. In one embodiment, the height of the bars 254 is about 40 microns. This has the effect of providing more accuracy, as the patterns 250 repeat more frequently. Note that the chevron-type servo pattern is but one of many that can be used in the present invention. Other illustrative servo patterns include "M" type / \ / \, | \ / |, / | \, etc.), "N" type (/ \ /, | \ |, / | /, etc.), etc. The M or N type patterns may be preferable to a simple two-bar chevron type servo patterns in some instances, such as where the N or M pattern contain parallel bars, thereby allowing the system to accurately calculate a velocity of the tape.

Variations and combinations of the foregoing types of servo base sets are also possible. Also note that the bars need not all have identical direct or inverse angles.

In various embodiments, the chevron angle α (defined between adjacent bars of differing directions) is increased, thereby allowing a faster servo pattern repetition rate. For example, one embodiment increases the chevron angle from the current 6 degrees to about 10-25 degrees, or more.

The servo patterns are preferably written at a high linear density, such that a 4× improvement in servo linear density over current LTO products is achieved.

The servo track may have data embedded or encoded therein. Such data may include data for encryption, for ascertaining a longitudinal position along the tape, etc.

The small width of the data bands also provides more immunity to read/write problems associated with tape dimensional instability, i.e., lateral expansion. For example, as mentioned above, current LTO experiences a lateral expansion of 3 μm per data band, which the tape drive must be designed to handle. The smaller widths of the data bands presented herein reduce the lateral expansion to about 0.5 to 0.7 μm per data band.

FIG. 2B depicts a plurality of read and/or write elements 106 formed in a gap 208 on the module 104 of FIG. 2A. As shown, the array of elements 106 includes, for example, 16 writers 209, 16 readers 210 and two servo readers 212, though the number of elements may vary. Illustrative embodiments include 8, 16, 32, and 40 elements per array 106. A preferred embodiment includes 24 readers per array and/or 24 writers per array. This allows the tape to travel more slowly, thereby reducing speed-induced tracking and mechanical difficulties. While the readers and writers may be arranged in a piggyback configuration as shown in FIG. 2B, the readers 210 and writers 209 may also be arranged in an interleaved configuration.

Alternatively, each array of elements 106 may be readers or writers only, and the arrays may contain one or more servo readers. As noted by considering FIGS. 1 and 2A-B together, each module 104 may include a complementary set of elements 106 for such things as bi-directional reading and writing, read-while-write capability, etc.

In preferred embodiments, the width of the servo head is such that transition broadening effects are minimized Giant Magnetoresistive (GMR) and Tunneling Magnetoresistive (GMR) devices are preferably used in servo readers for advanced formats which require servo readers having small track widths such as 0.5 micrometers.

According to one embodiment, the head elements are positioned such that the span between the outermost servo elements is reduced approximately a factor of 2 to 6 compared to the present LTO servo span. The span is reduced approximately a factor of 5.4 in a preferred embodiment. The servo span reduction factor is approximately the track pitch improvement factor. Thus, reducing the span a factor of about 5 by scaling gives approximately a factor of 5 increase in the maximum number of tracks on a tape before lateral instability limits track density. The writers are designed to accommodate the new pitch and are described in detail below.

FIG. 2E illustrates the relative sizes of a current LTO element array 260 and element arrays 262 according to one embodiment of the present invention. As shown, the servo-to-servo reader span ($S_1$ to $S_2$) of array 260 is 5.4× the servo-to-servo reader span ($S_1$ to $S_2$) of array 262. As will be clear to those skilled in the art of magnetic head design, the new arrays described herein present space limitation challenges not encountered in conventional head design.

The servo-to-servo reader span in a linearly-aligned 16-writer array in various embodiments of the present invention may be less than about 1.5 mm, and in some embodiments may be less than about 1 mm, less than about 0.75 mm in other embodiments, and less than about 0.5 mm in yet other embodiments. The writer pitch in some embodiments is between about 15 and about 45 microns. For instance, in one contemplated design, the writer pitch is between about 31 and about 33 microns. In another contemplated design, the writer pitch is between about 28 and about 29 microns.

In order to achieve this order of span and/or pitch reduction as compared to conventional state of the art systems, the inventors were required to proceed counter intuitively and contrary to accepted wisdom in the art on several fronts. Instances where the inventors deviated from accepted wisdom are presented below.

In known "pancake" type writers, the width of the back gap is generally 3× or more greater than the track width defined at the front gap. This design minimizes reluctance in the back gap, which improves writing efficiency and enables required magnetic flux to reach the recording gap before magnetically saturating the back gap. Accordingly, all known tape head designers have adopted designs where the back gap width is greater than about 3× the front gap width. However, this design places limits on the write pitch and thus minimum width of the writer array. For instance, the servo-to-servo reader span in a 16-writer array in LTO current products is about 2.9 mm.

Further compounding the problem, when writers are too close together, they may magnetically couple together. This phenomenon is sometimes referred to as writer coupling. In brief, when write coupling occurs, the field generated in one writer causes a field to be generated in the poles of an adjacent writer, thereby potentially causing writing of "ghost" transitions that may lead to readback noise. Conventional wisdom has been to space the writers sufficiently so that write coupling is nonexistent.

The inventors have found that by dramatically reducing the back gap width relative to the front gap width, in combination with a coil redesigned as set forth below, the close writer spacing required to achieve the small writer pitch is obtainable without causing unacceptable write coupling.

Figure 3A:
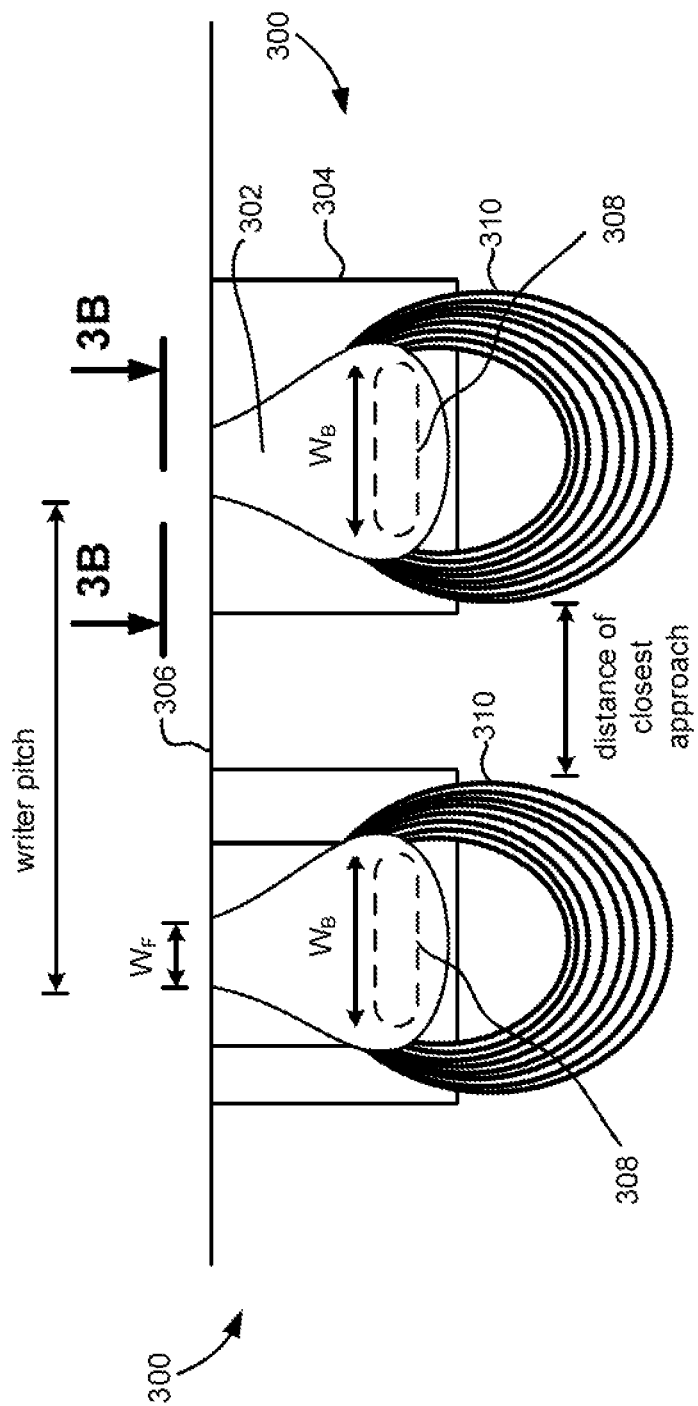
FIG. 3A is a partial view of a writer array in a magnetic tape head according to one embodiment of the present invention.

Referring to FIG. 3A, two pancake-type writers 300 of a linear array of writers are shown, according to one embodiment of the present invention. Each writer 300 has first and second poles 302, 304. Each pole 302, 304 has at least one pole tip positioned towards the tape bearing surface 306 of the head. Note that while the term "tape bearing surface" appears to imply that the surface facing the tape is in physical contact with the tape bearing surface, this is not necessarily the case. Rather, it is more typical that a portion of the tape is in contact with the tape bearing surface, constantly or intermittently, and other portions of the tape ride above the tape bearing surface on a layer of air, sometimes referred to as an "air bearing".

Figure 3B:
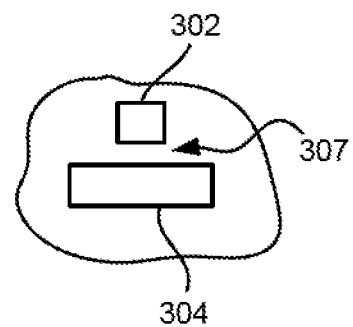
FIG. 3B is a partial view taken along Line 3B-3B of FIG. 3A.

As shown in FIG. 3B, a front gap 307 is defined between the pole tips 302, 304. Referring again to FIG. 3A, a back gap 308 is defined along an electrical coupling of the poles 302, 304 at portions thereof positioned away from the tape bearing surface 306. Widths of the front and back gaps 307, 308 are defined in a direction parallel to the tape bearing surface 306 and parallel to planes of deposition thereof. Each writer 300 also includes a coil 310. The coil in one contemplated embodiment includes 10-14 turns, with 10-12 being preferred.

Figure 4:
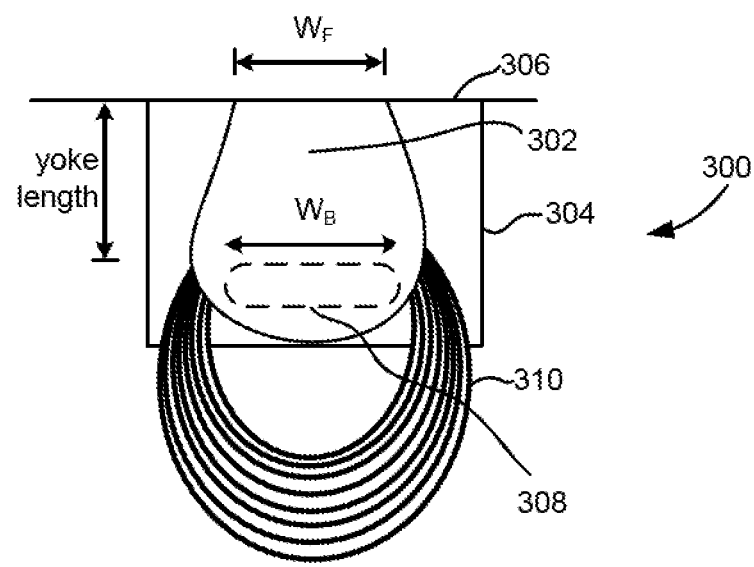
FIG. 4 is a partial view of a writer according to one embodiment of the present invention.

The ratio between the back gap width $W_B$ and front gap width $W_F$ (e.g., back gap width to upper pole width in front gap) is less than 3:1 and preferably less than about 2.5:1, more preferably less than about 1.5:1, and in some embodiments between about 1.5:1 and about 0.9:1. FIG. 4 illustrates a writer 300 having a back gap width $W_B$ to front gap width $W_F$ ratio of about 1:1. Illustrative embodiments have a front gap width $W_F$ of about 2 to about 10 microns, with a written track width on tape of about 0.5 to about 10 microns (depending on whether or not the tracks are shingled).

Figure 5:
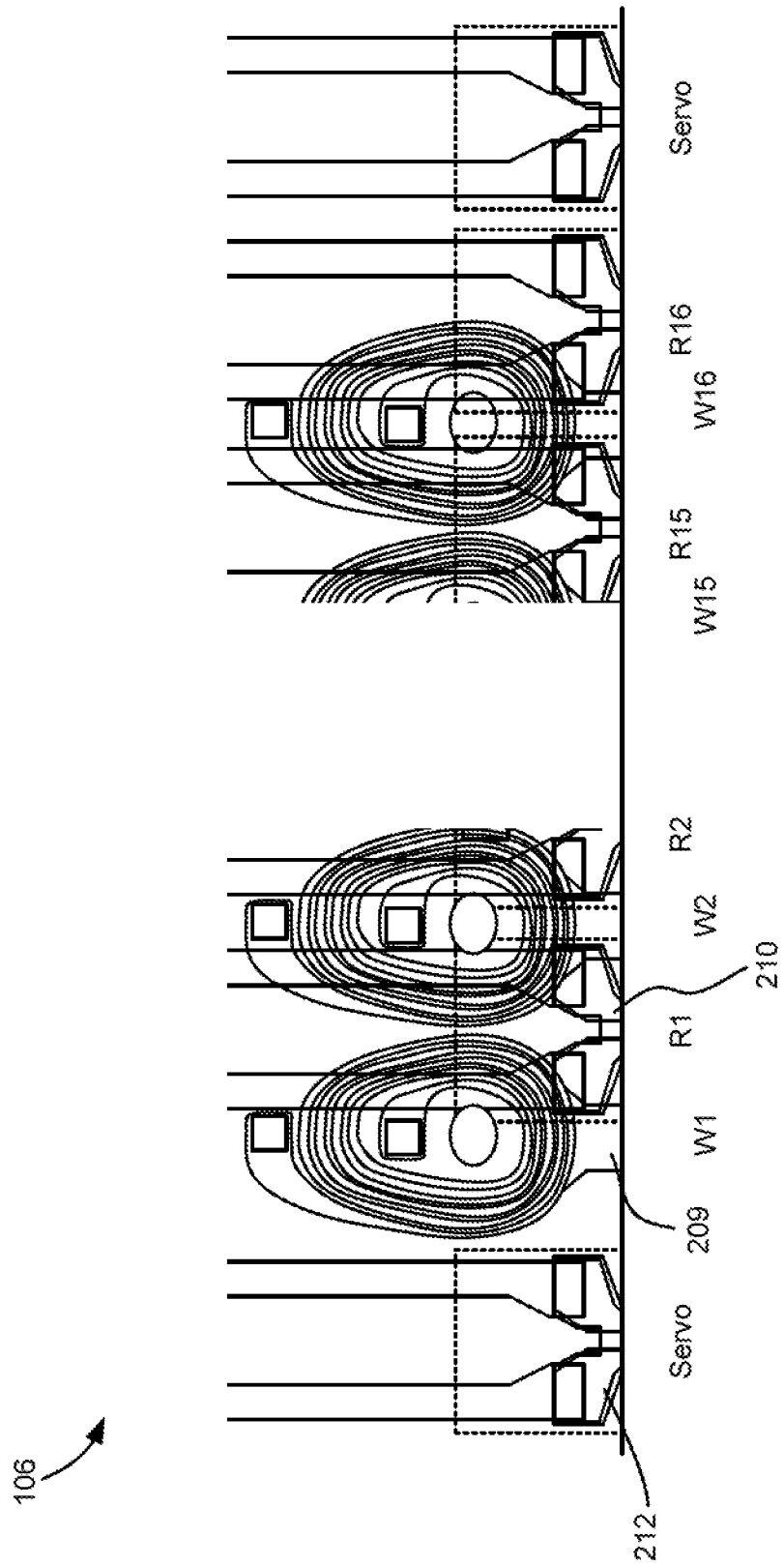
FIG. 5 is a partial plan view of an illustrative embodiment of the present invention having piggybacked readers and writers.

Because the back gap width $W_B$ is relatively smaller, the diameter of the coil 310 across the back gap 308 and parallel to the tape bearing surface 306 is reduced, thereby enabling minimum writer pitch. Coupling between writer coils may be further reduced by tapering the footprint of the coils away from the back gap, as shown in FIG. 5. At the same time the coil windings can be broadened to minimize coil resistance without affecting the cross-talk between writers. This in turn allows the writers 300 to be spaced closer together without incurring unacceptable levels of writer coupling. Additionally, the coil 310 of each writer 300 is designed to provide adequate flux while maximizing the distance of closest approach of adjacent coils. Coil parameters include coil aspect ratio, coil thickness, and distance between adjacent coils.

To further reduce the effects of write coupling, the writer pitch may be modified to further maximize the distance of closest approach of adjacent coils.

The narrower widths of the poles 302, 304 behind the front gap also provides less surface area for flux to jump between the poles, thereby improving writing accuracy and reliability.

The coil is preferably stacked in two or more layers. This provides two advantages. First, the yoke length may be shortened. This results in les eddy current slowing of the field rise time, which in turn results in faster writing response time. Second, the parasitic reluctance is improved by decreasing the area covered by the coil and increasing the distance between the poles. Lower stray reluctance gives higher overall efficiency and thus generally lower write currents. Lower write currents result in less cross talk between writers. In addition, back gap separation is avoided.

The inventors have created prototype heads having the some of the aforementioned dimensions, and have found the heads to write sharp transitions efficiently. The heads also provided several surprising and unexpected results. One such result is that the head provided sharper transitions of written data than state of the art heads. Another such result is that the head provided better overwrite performance than state of the art heads. Yet another such surprising and unexpected result is that the head provided better write equalized resolution than state of the art heads.

FIG. 5 depicts an illustrative 16 channel R/W array 106 according to one illustrative embodiment. As shown, the data readers 210 (R1, R2 . . . ) are offset from the writers 209 (W1, W2 . . . ). Servo readers 212 (Servo) are also present.

Another way to build the head is to have the functions of reading and writing performed on different modules. As shown in the write-read-write (W-R-W) head 600 of FIG. 6, outer writing modules 602, 604 flank a single reading module 606. As the names imply, the outer modules 602, 604 include two or more arrays of writers in a configuration, for example, as shown in FIG. 3A. With continued reference to FIG. 6, the reading module 606 includes two or more arrays of readers. The modules 602, 604, 606 are offset and set in relationship with each other such that internal wrap angles are defined between the modules 602, 604, 606. Cables 609 connect the elements to a controller.

In this embodiment, the tape bearing surfaces of the modules may lie on parallel or nearly parallel planes, but are offset in a direction perpendicular to the planes. When the tape 608 moves across the head 600 as shown, air is skived from below the tape 608 by a skiving edge 610 of the first outer writing module 602, and instead of the tape 608 lifting from the tape bearing surface 612 of the first outer module 602 (as intuitively it should), the reduced air pressure in the area between the tape 608 and the tape bearing surface 612 allow atmospheric pressure to urge the tape towards the tape bearing surface 612. The trailing end 620 of the outer writing module 602 (the end from which the tape leaves the outer writing module 602) is proximate to the reference point which defines the wrap angle over the tape bearing surface of the inner reading module 606. The same is true of the other outer writing module 604 when the tape travel direction is reversed.

Figure 6:
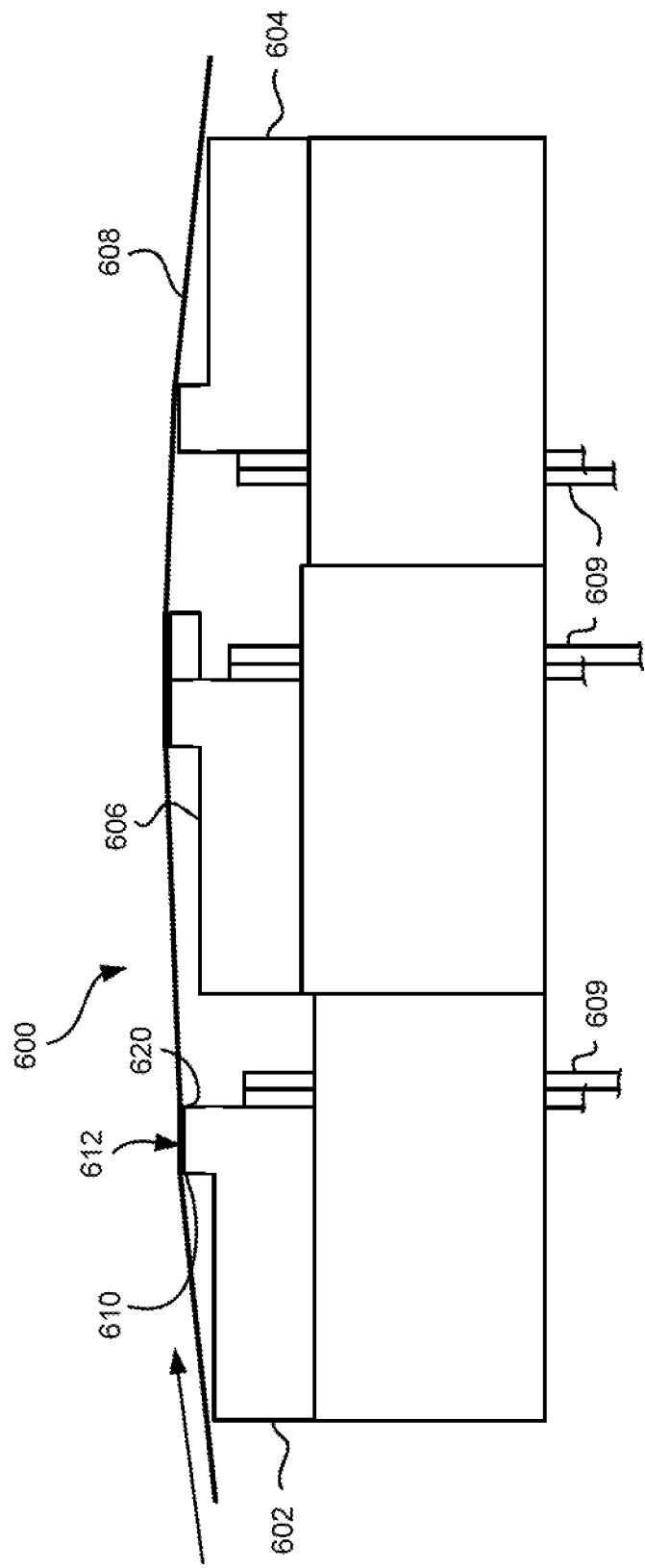
FIG. 6 is a side view of a tape head having three modules according to one embodiment of the present invention.

Variations on the head 600 of FIG. 6 include a R-W-R head, a R-R-W head, a W-W-R head, etc. For example, in a R-W-R head, the outer modules 602, 604 perform reading while the middle module 606 performs writing. In a R-R-W head, the leading module 602 and middle module 606 perform reading while the trailing module 604 performs writing. In a W-W-R head, the leading module 602 and middle module 606 perform writing while the trailing module 604 performs reading. Again, the leading and trailing modules 602, 604 may operate concurrently with each other and the middle module 606, may operate individually, or may operate in combinations of two modules.

Figure 7A:
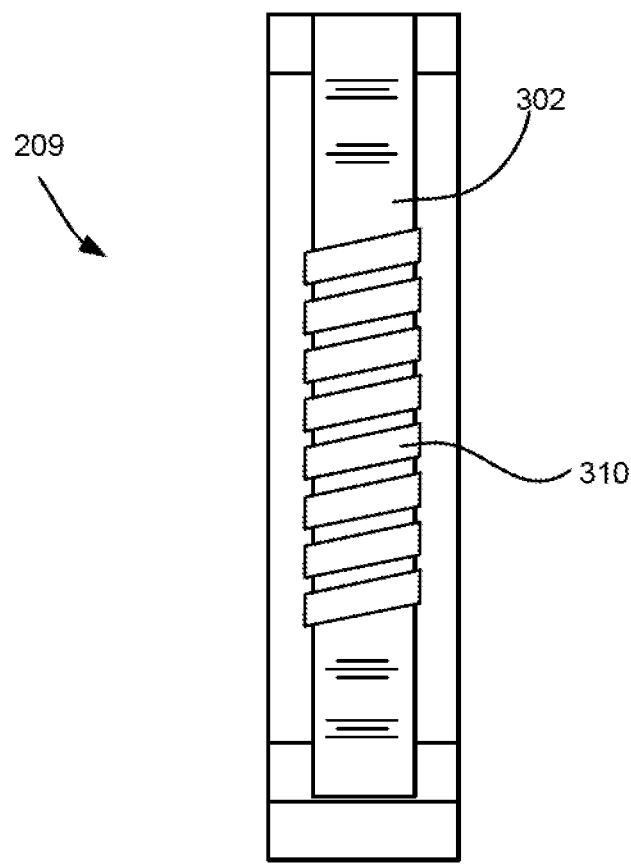
FIGS. 7A and 7B illustrate a writer 8 according to another embodiment of the present invention.
Figure 7B:
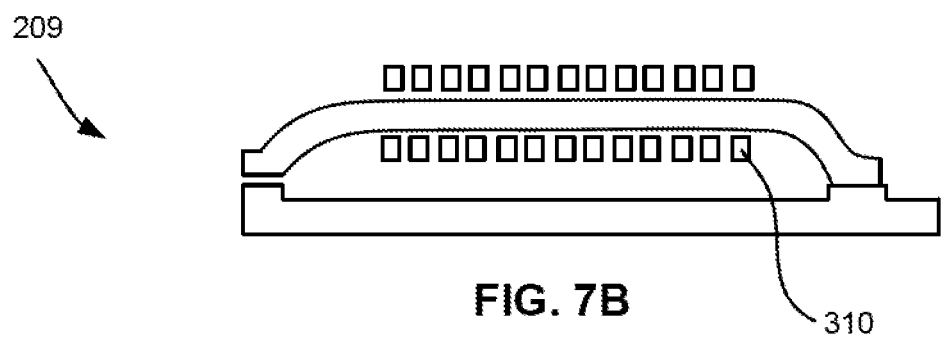

FIGS. 7A and 7B illustrate a writer 209 according to another embodiment of the present invention. As shown, the writer 209 is a solenoid coil type writer. The coil 310 wraps around the upper pole 302.

In another embodiment, the coil wraps the bottom pole. In yet another embodiment, the coils wrap both poles in a double helix configuration.

Figure 8:
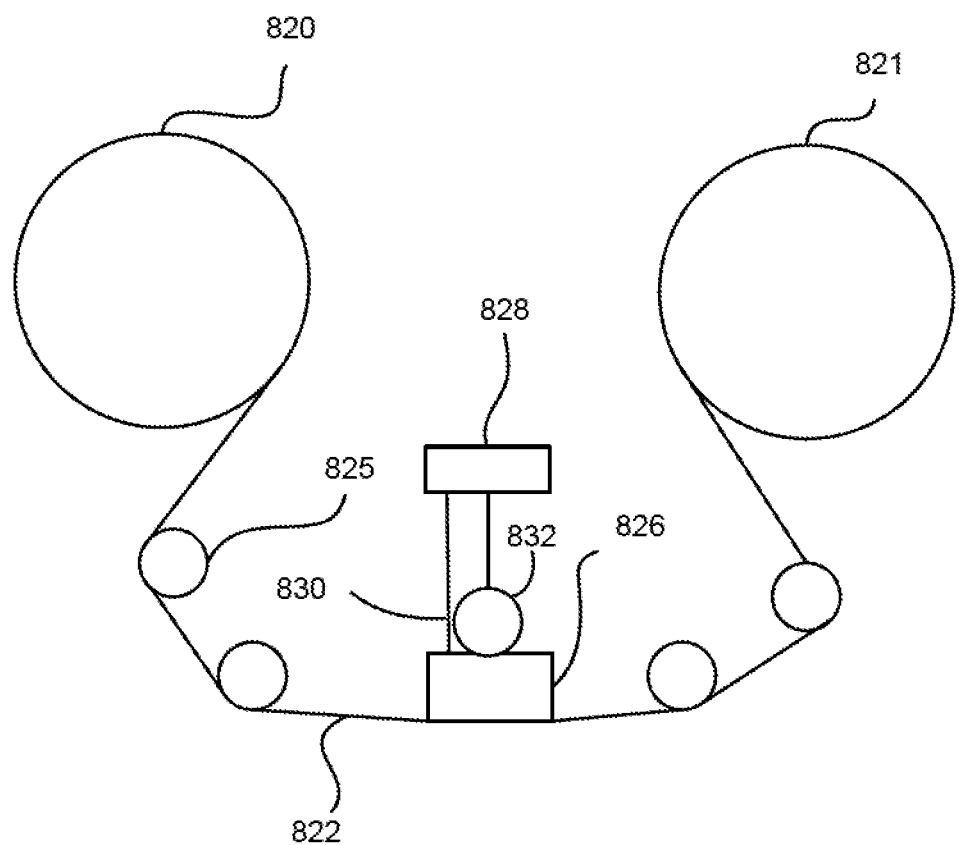
FIG. 8 is a schematic diagram of a tape chive system according to one embodiment of the present invention.

FIG. 8 illustrates a simplified tape drive which may be employed in the context of the present invention. While one specific implementation of a tape drive is shown in FIG. 8, it should be noted that the embodiments of the previous figures may be implemented in the context of any type of tape drive system.

As shown, a tape supply cartridge 820 and a take-up reel 821 are provided to support a tape 822. These may form part of a removable cassette and are not necessarily part of the system. Guides 825 guide the tape 822 across a preferably bidirectional tape head 826, of the type disclosed herein. Such tape head 826 is in turn coupled to a controller assembly 828 via a write-read cable 830. The controller 828, in turn, controls head functions such as servo following, writing, reading, etc. An actuator 832 controls position of the head 826 relative to the tape 822.

A tape drive, such as that illustrated in FIG. 8, includes drive motor(s) to drive the tape supply cartridge 820 and the take-up reel 821 to move the tape 822 linearly over the head 826. The tape drive also includes a read/write channel to transmit data to the head 826 to be recorded on the tape 822 and to receive data read by the head 826 from the tape 822. An interface is also provided for communication between the tape drive and a host (integral or external) to send and receive the data and for controlling the operation of the tape drive and communicating the status of the tape drive to the host, all as will be understood by those of skill in the art.

One skilled in the art will appreciate that the dimensions given above and other places herein are presented by way of example only and can be made larger or smaller per design and fabrication constraints, performance considerations, etc.

Any of the above embodiments or combinations of portions thereof can also be applied to any type of tape head and magnetic tape recording systems, both known and yet to be invented. For example, the teachings herein are easily adaptable to interleaved heads, which typically include opposing modules each having an array of alternating readers and writers configured to provide read-while-write capability.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic recording tape, comprising:
   a plurality of servo tracks, each servo track comprising a series of magnetically defined bars,
   wherein an angle between at least some of the bars is greater than about 10 degrees,
   wherein an average height of the bars is less than 190 microns,
   wherein one of the servo tracks has data encoded therein, the data being selected from a group consisting of data for encryption and data for ascertaining a longitudinal position along the tape,
   wherein each servo track comprises a series of base sets of magnetically defined bars, each base set comprising at least four bars in an "M" type servo pattern.

2. The magnetic recording tape as recited in claim 1, wherein the angle is between about 10 and about 25 degrees.

3. The magnetic recording tape as recited in claim 1, wherein about eight to about twenty six data bands are present on the tape.

4. The magnetic recording tape as recited in claim 1, the average height of the bars is less than about 50 microns.

5. The magnetic recording tape as recited in claim 1, wherein a distance between the servo tracks is less than about 1.5 mm.

6. The magnetic recording tape as recited in claim 1, wherein the distance between the servo tracks is less than about 0.75 mm.

7. A tape cartridge having the magnetic recording tape as recited in claim 1.

8. A magnetic recording tape, comprising:
   at least about eight data bands, wherein each data band is defined between a pair of adjacent servo tracks, each pair of adjacent servo tracks defining only a single data band therebetween,
   wherein one of the servo tracks has data encoded therein, the data including data for encryption,
   wherein each servo track comprises a series of base sets of magnetically defined bars, each base set comprising at least four bars in an "M" type servo pattern.

9. The magnetic recording tape as recited in claim 8, wherein each servo track comprises a series of magnetically defined bars, wherein an angle between at least some of the bars is between about 10 degrees and about 25 degrees.

10. The magnetic recording tape as recited in claim 8, wherein a distance between the servo tracks is less than about 1.5 mm.

11. The magnetic recording tape as recited in claim 8, wherein the distance between the servo tracks is less than about 0.75 mm.

12. A tape cartridge having the magnetic recording tape as recited in claim 8.

13. A magnetic recording tape, comprising:
   a plurality of servo tracks, each servo track comprising a series of magnetically defined bars,
   wherein an average height of the bars is less than about 50 microns,
   wherein about eight to about twenty six data bands are present on the tape,
   wherein one of the servo tracks comprises at least one of:
      a series of base sets where each base set comprises at least four bars in an "M" type servo pattern, and
      data encoded therein, the data being data for encryption.

14. The magnetic recording tape as recited in claim 13, wherein each servo track comprises a series of magnetically defined bars, wherein an angle between at least some of the bars is between about 10 degrees and about 25 degrees.

15. The magnetic recording tape as recited in claim 13, wherein a distance between the servo tracks is less than about 1.5 mm.

16. The magnetic recording tape as recited in claim 13, wherein the one of the servo tracks comprises the series of base sets of magnetically each base set comprising at least four bars in an "M" type servo pattern.

17. The magnetic recording tape as recited in claim 13, wherein the one of the servo tracks has the data encoded therein.

18. A tape cartridge having the magnetic recording tape as recited in claim 13.

\* \* \* \* \*